US012650816B2

(12) United States Patent
Sarab et al.

(10) Patent No.: US 12,650,816 B2
(45) Date of Patent: Jun. 9, 2026

(54) SYSTEMS AND METHODS FOR PROVIDING TOOLS FOR THE SECURE CREATION, TRANSMITTAL, REVIEW OF, AND RELATED OPERATIONS ON, HIGH VALUE ELECTRONIC FILES

(71) Applicants: Greg N. Sarab, Half Moon Bay, CA (US); Alexa J. Fanti, Reisterstown, MD (US)

(72) Inventors: Greg N. Sarab, Half Moon Bay, CA (US); Alexa J. Fanti, Reisterstown, MD (US)

(73) Assignee: Extegrity, Incorporated, Half Moon Bay, CA (US)

( * ) Notice: Subject to any disclaimer, the term of this patent is extended or adjusted under 35 U.S.C. 154(b) by 157 days.

(21) Appl. No.: 18/106,466

(22) Filed: Feb. 6, 2023

(65) Prior Publication Data

US 2023/0185539 A1 Jun. 15, 2023

Related U.S. Application Data

(63) Continuation-in-part of application No. 16/807,080, filed on Mar. 2, 2020, now abandoned, which is a continuation-in-part of application No. 13/986,036, filed on Mar. 25, 2013, now abandoned, which is a continuation-in-part of application No. 13/211,291, filed on Aug. 16, 2011, now Pat. No. 9,953,175.

(60) Provisional application No. 61/373,874, filed on Aug. 16, 2010.

(51) Int. Cl.
G06F 8/20 (2018.01)
G06F 9/451 (2018.01)

(52) U.S. Cl.
CPC ............... *G06F 8/20* (2013.01); *G06F 9/451* (2018.02)

(58) Field of Classification Search
CPC ... G09B 7/02; G09B 7/06; G09B 7/00; G06Q 10/10
See application file for complete search history.

(56) References Cited

U.S. PATENT DOCUMENTS

| | | | | | |
|---|---|---|---|---|---|
| 5,509,805 | A | * | 4/1996 | Jagmin | A61B 5/1178 433/229 |
| 5,513,994 | A | * | 5/1996 | Kershaw | G09B 7/07 434/323 |
| 5,565,316 | A | * | 10/1996 | Kershaw | G09B 7/02 434/350 |
| 6,341,212 | B1 | * | 1/2002 | Shende | G09B 5/02 434/323 |
| 6,470,171 | B1 | * | 10/2002 | Helmick | G09B 5/00 434/350 |
| 7,069,586 | B1 | * | 6/2006 | Winneg | G06F 21/52 726/16 |
| 2001/0031457 | A1 | * | 10/2001 | Pfenninger | G09B 5/00 434/350 |
| 2002/0078139 | A1 | * | 6/2002 | Dutta | G09B 7/02 709/203 |
| 2002/0137016 | A1 | * | 9/2002 | Helmick | G09B 5/00 434/362 |

(Continued)

*Primary Examiner* — Tae K Kim
(74) *Attorney, Agent, or Firm* — Jeffery Frazier

(57) ABSTRACT

Embodiments are described of systems and methods for the creation, transmittal, review of, and related operations on, as well as the prevention, detection, and such, of unauthorized manipulation (e.g., substitution) of, high-value data files, including electronic documents.

14 Claims, 5 Drawing Sheets

(56) References Cited

U.S. PATENT DOCUMENTS

| | | | | |
|---|---|---|---|---|
| 2002/0172930 A1* | 11/2002 | Sirhall | | G09B 7/02 |
| | | | | 434/322 |
| 2002/0172931 A1* | 11/2002 | Greene | | G09B 7/00 |
| | | | | 434/322 |
| 2003/0087223 A1* | 5/2003 | Walker | | G09B 7/02 |
| | | | | 434/353 |
| 2004/0073866 A1* | 4/2004 | Kunzel | | G06F 40/166 |
| | | | | 715/255 |
| 2004/0229199 A1* | 11/2004 | Ashley | | G09B 7/00 |
| | | | | 434/323 |
| 2005/0033702 A1* | 2/2005 | Holdsworth | | G06Q 20/108 |
| | | | | 705/67 |
| 2005/0095571 A1* | 5/2005 | Miller | | G09B 7/02 |
| | | | | 434/350 |
| 2006/0003306 A1* | 1/2006 | McGinley | | G09B 3/00 |
| | | | | 434/350 |
| 2007/0117083 A1* | 5/2007 | Winneg | | G09B 7/00 |
| | | | | 434/350 |
| 2008/0102431 A1* | 5/2008 | Rogers | | G09B 7/02 |
| | | | | 434/350 |
| 2008/0104618 A1* | 5/2008 | Rogers | | G09B 5/00 |
| | | | | 719/328 |
| 2008/0133964 A1* | 6/2008 | Rogers | | G06F 11/2294 |
| | | | | 714/E11.113 |
| 2009/0087827 A1* | 4/2009 | Goldburd | | G09B 7/06 |
| | | | | 434/362 |
| 2009/0162827 A1* | 6/2009 | Benson | | G06F 16/285 |
| | | | | 434/350 |
| 2009/0186327 A1* | 7/2009 | McGinley | | G09B 3/00 |
| | | | | 434/323 |
| 2009/0291426 A1* | 11/2009 | Polivka | | G09B 7/00 |
| | | | | 434/350 |
| 2011/0177484 A1* | 7/2011 | Morgan | | G09B 5/065 |
| | | | | 434/322 |
| 2011/0207108 A1* | 8/2011 | Dorman | | G09B 9/00 |
| | | | | 434/350 |
| 2011/0223576 A1* | 9/2011 | Foster | | G09B 7/02 |
| | | | | 434/362 |
| 2011/0244440 A1* | 10/2011 | Saxon | | G06F 9/5027 |
| | | | | 434/362 |
| 2014/0212865 A1* | 7/2014 | Morgan | | G09B 7/00 |
| | | | | 434/350 |
| 2018/0225982 A1* | 8/2018 | Jaeh | | G09B 7/00 |

* cited by examiner

Fig. 4

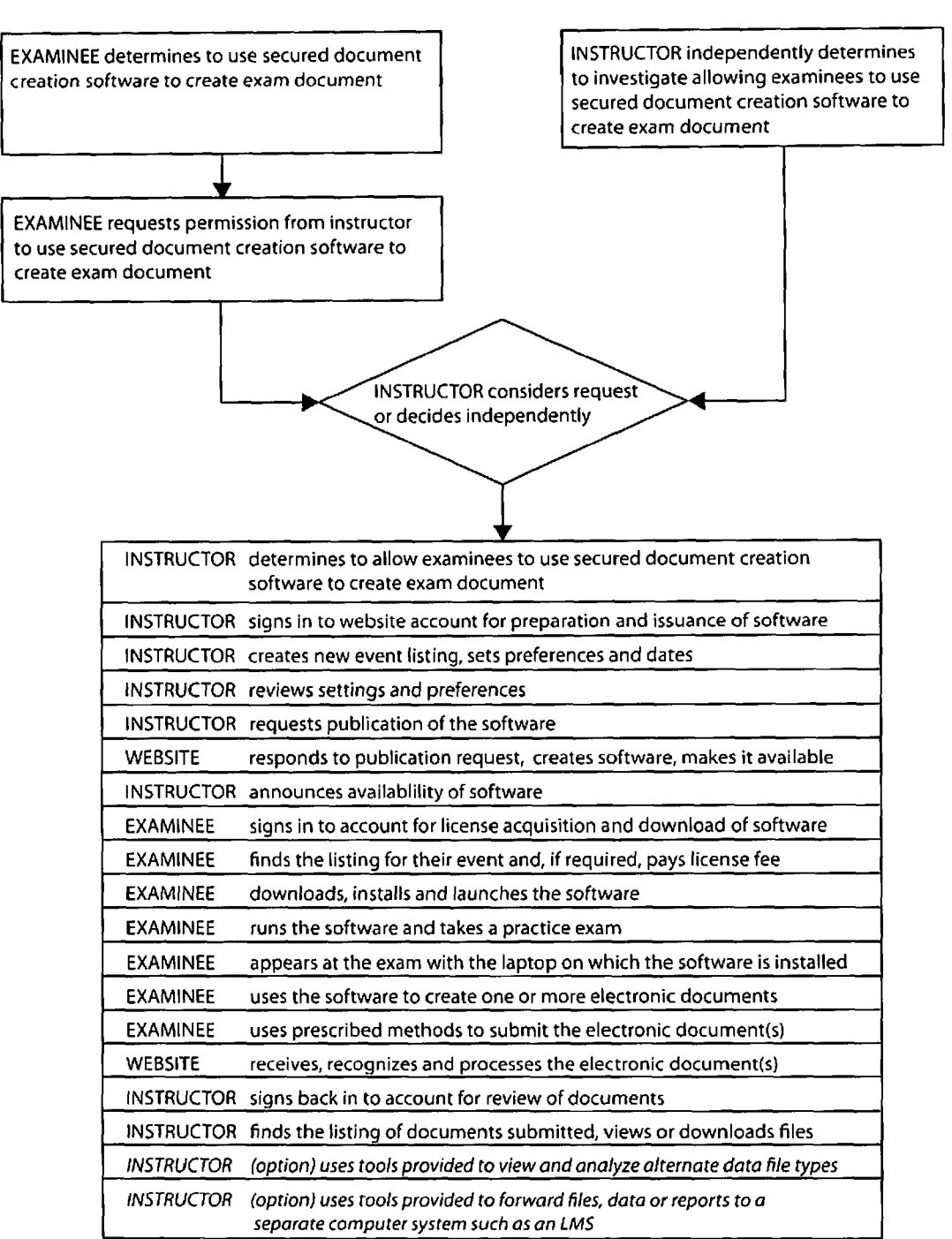

| | |
|---|---|
| INSTRUCTOR | determines to allow examinees to use secured document creation software to create exam document |
| INSTRUCTOR | signs in to website account for preparation and issuance of software |
| INSTRUCTOR | creates new event listing, sets preferences and dates |
| INSTRUCTOR | reviews settings and preferences |
| INSTRUCTOR | requests publication of the software |
| WEBSITE | responds to publication request, creates software, makes it available |
| INSTRUCTOR | announces availablility of software |
| EXAMINEE | signs in to account for license acquisition and download of software |
| EXAMINEE | finds the listing for their event and, if required, pays license fee |
| EXAMINEE | downloads, installs and launches the software |
| EXAMINEE | runs the software and takes a practice exam |
| EXAMINEE | appears at the exam with the laptop on which the software is installed |
| EXAMINEE | uses the software to create one or more electronic documents |
| EXAMINEE | uses prescribed methods to submit the electronic document(s) |
| WEBSITE | receives, recognizes and processes the electronic document(s) |
| INSTRUCTOR | signs back in to account for review of documents |
| INSTRUCTOR | finds the listing of documents submitted, views or downloads files |
| INSTRUCTOR | (option) uses tools provided to view and analyze alternate data file types |
| INSTRUCTOR | (option) uses tools provided to forward files, data or reports to a separate computer system such as an LMS |

Fig. 5

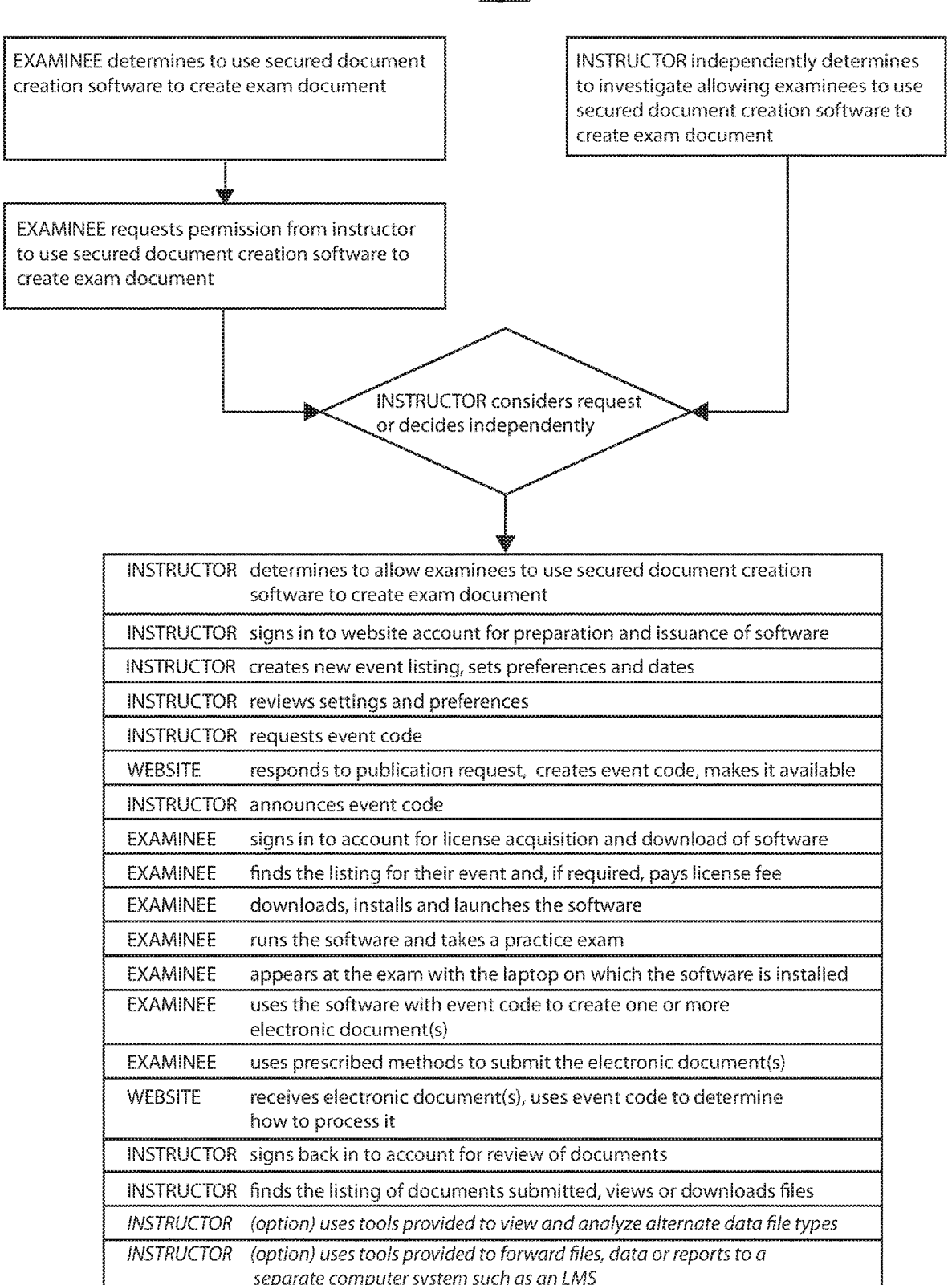

EXAMINEE determines to use secured document creation software to create exam document INSTRUCTOR independently determines to investigate allowing examinees to use secured document creation software to create exam document EXAMINEE requests permission from instructor to use secured document creation software to create exam document INSTRUCTOR considers request or decides independently

| INSTRUCTOR | determines to allow examinees to use secured document creation software to create exam document |
|---|---|
| INSTRUCTOR | signs in to website account for preparation and issuance of software |
| INSTRUCTOR | creates new event listing, sets preferences and dates |
| INSTRUCTOR | reviews settings and preferences |
| INSTRUCTOR | requests event code |
| WEBSITE | responds to publication request, creates event code, makes it available |
| INSTRUCTOR | announces event code |
| EXAMINEE | signs in to account for license acquisition and download of software |
| EXAMINEE | finds the listing for their event and, if required, pays license fee |
| EXAMINEE | downloads, installs and launches the software |
| EXAMINEE | runs the software and takes a practice exam |
| EXAMINEE | appears at the exam with the laptop on which the software is installed |
| EXAMINEE | uses the software with event code to create one or more electronic document(s) |
| EXAMINEE | uses prescribed methods to submit the electronic document(s) |
| WEBSITE | receives electronic document(s), uses event code to determine how to process it |
| INSTRUCTOR | signs back in to account for review of documents |
| INSTRUCTOR | finds the listing of documents submitted, views or downloads files |
| *INSTRUCTOR* | *(option) uses tools provided to view and analyze alternate data file types* |
| *INSTRUCTOR* | *(option) uses tools provided to forward files, data or reports to a separate computer system such as an LMS* |

SYSTEMS AND METHODS FOR PROVIDING TOOLS FOR THE SECURE CREATION, TRANSMITTAL, REVIEW OF, AND RELATED OPERATIONS ON, HIGH VALUE ELECTRONIC FILES

RELATED APPLICATIONS

The present application is a continuation-in-part (CIE) of U.S. patent application Ser. No. 16/807,080 filed on Mar. 2, 2020 which published as US 2020-0279223 A1 on Sep. 3, 2020; which is a continuation-in-part (CIP) of U.S. patent application Ser. No. 13/986,036 filed on Mar. 25, 2013, which published as US 2013-0219515 A1 on Aug. 22, 2013; which, in turn, is a continuation-in-part (CIE) of U.S. patent application Ser. No. 13/211,291 filed on Aug. 16, 2011, which issued as U.S. Pat. No. 9,953,175 on Apr. 24, 2018; which, in turn, claims priority to U.S. Provisional Patent Application No. 61/373,874 filed on Aug. 16, 2010, which has expired. Each of the foregoing application is incorporated herein by reference in its entirety.

FIELD

The present teachings relate to the creation, transmittal, review of, and related operations on, as well as the prevention, detection, and such, of unauthorized manipulation (e.g., substitution) of, high-value data files, including electronic documents.

INTRODUCTION

Situations or events occur where high-value data files are generated by numerous users for submittal to the situation or event authority, and where it is highly desirable to know that the files are original as created during the authorized time period and location of the event. Such a situation or event may be for example, without limitation, a test or exam, such as a computer-based academic or professional exam (e.g., professional credentialing exam, final exam for a college course, etc.), or the like, wherein the examinee provides answers or inputs which create or populate a data file in one or more memory devices of a computer (e.g., a PC, such as a laptop PC), and where submittal of data files may occur at any time following the creation of the files.

SUMMARY

An exemplary and non-limiting summary of various embodiments is set forth next.

Various aspects of the present teachings relate to systems and methods for the creation, transmittal, review of, and related operations on, as well as the prevention, detection, and such, of unauthorized manipulation (e.g., substitution) of high-value data files, including electronic documents.

Further aspects of the present teachings, according to various embodiments, relate to systems and methods that: 1) allow an authority to configure software especially used for the creation of uniformly formatted data files, including when it is desired that access to outside information be tightly controlled during the creation of the data file; 2) make the software available to one or more untrusted agents interested in creating a data file per the requirements of the authority; 3) provide integrated means for submitting the file for further processing; and 4) allow the authority to then view and perform other operations on the files within a secured environment.

According to various embodiments, a system of the present teachings can mediate an exchange of documents between two parties, an authority and untrusted agent/s generating the files, where the authority seeks a high level of assurance on one or more aspects of the creation of the file.

According to various embodiments, a system or method allowing for the generation and management of these files can comprise: 1) a highly secure method for creation, transmittal, review and related operations, and 2) a highly secure method for prevention or detection of substitution.

The present teachings provide, among other things, various embodiments of systems and methods for the generation and management of high-value data files (including electronic documents) by means of a system or method that comprises the aspects: 1) a highly secure method for creation, transmittal, review of, and related operations, and 2) a highly secure method for prevention, detection, mitigation of risk, and such, of unauthorized manipulation substitution).

Regarding the first aspect enumerated in the preceding paragraph, various aspects of the present teachings relate, among other things, to a method for creation, transmittal, review of, and related operations on, high-value data files. According to various embodiments, a method for these activities can comprise:

(i) by or on behalf of the authority, gain of access to a computer system for requesting, creating, and ultimately signing into an account or otherwise obtaining the means, permission, controls, and other factors to initiate the preparation and issuance of software that can be used to generate the data files desired;

(ii) by behalf of the authority, creation of a new situation or event listing (e.g., a college course, a professional credentialing exam, etc.) with information sufficient to allow the untrusted agent(s) (e.g., a college course student, a professional credentialing examinee, etc.) to find and select the listed situation or event, as well as, in some embodiments, certain preferences pertaining to the software (e.g.: settings controlling various aspects or the software operation, dates within which the software may be used, etc.);

(iii) by or on behalf of the authority, review of the selected preferences pertaining to the proposed software client;

(iv) by or on behalf of the authority, upon satisfactory review of the selected preferences pertaining to the proposed software client, execution of a request for publication of said software client in order to make it available to the unfrosted agent(s);

(v) by the computer system, actual preparation and publication of such software;

(vi) by or on behalf of the authority, announcement of the availability of the software for download by the untrusted agents;

(vii) by or on behalf of the untrusted agent, gain of access to a computer system for requesting, creating, and ultimately signing into an account or otherwise obtaining the means, permission, controls, and other factors to select and download the software, published by the correct authority and pertaining to the correct event, that can be used to generate the data files desired;

(viii) by or on behalf of the untrusted agent, use of tools provided by said computer system to actually find and download the correct copy of the software;

(ix) by or on behalf of the untrusted user, use of tools provided by said software to install and launch the software;

(x) by or on behalf of the untrusted user, optionally, use of instructions provided by said computer system and tools provided by said software to run the software in such a way as to complete the creation of a sample file (for example: if done in preparation for a college exam, this step could be precipitated by the direction to "take a practice exam");

(xi) by the untrusted user, appearance at the situation or event, with access to the computer upon which the software has been installed;

(xii) by the untrusted user, actual creation of one or more high-value data files by use of the subject software;

(xiii) by or on behalf of the untrusted agent, submittal of the data file via means enumerated in the next paragraph;

(xiv) by the computer system, receipt, recognition, processing and delivery of the data files according to the preferences indicated by the authority;

(xv) by or on behalf of the authority, gain of access to the computer system by signing into the corresponding account;

(xvi) by or on behalf of the authority, use of tools provided by said computer system to find and view or download the data files;

(xvii) by or on behalf of the authority, optionally, use of tools provided by said computer system to further analyze and view reports regarding certain kinds of digital file content (e.g.: multiple choice exam answers, compilations of content from multiple files, etc.).

(xviii) by or on behalf of the authority, optionally, use of tools provided by said computer system to forward files, reports or other data created by the computer system into a separate computer system that may be operated by or on behalf of the authority (e.g.: a learning management system, a grade reporting system, etc.).

In addition, various aspects of the present teachings relate, among other things, to methods and systems for detecting substitution of information by an untrusted agent. According, to various embodiments, an exemplary method for detecting substitution of information by an untrusted agent can comprise: (i) providing secured electronic document creation software for use by an unfrosted agent for creating informational content within a primary information carrier during a controlled time period and in a controlled location; (ii) embedding identifying information into the primary information carrier; (iii) protecting the informational content and identifying information within the primary information carrier by encryption; (iv) preventing editing of the informational content within the primary information carrier after the controlled time period and outside the controlled location; (v) reporting the identifying information to the unfrosted agent at the end of the controlled time period and before the untrusted agent exits the controlled location, with a direction to the untrusted agent to record the identifying information to a secondary information carrier; (vi) delivering the primary information carrier, by the untrusted agent to a primary information channel, to an authority, and delivering the secondary information carrier, by the untrusted agent via a secondary information channel to the authority, before the untrusted agent exits the controlled location; (vii) comparing, the identifying information contained in the secondary information carrier with the corresponding identifying information embedded in the primary information carrier; and, (viii) using the results of the comparing step to determine whether substitution of the primary information carrier occurred.

In accordance with various embodiments the present teachings, the examination location is controlled (e.g., a controlled room or other examination environment). Any suitable procedures, standards, and means for controlling an examination known to those skilled in the art can be employed with the present teachings.

Whether the untrusted agent is in a designated location or not can be readily determined by various means known to those skilled in the art. In an exemplary embodiment of the present teachings, trusted agents of the examining authority are posted in the path of exit from the room. In this way, the trusted agent can observe, upon local and/or remote monitoring, whether the untrusted agent is in the examination location or leaves the location. In various embodiments, for example, the examination environment comprises one or more camera controlled examination rooms.

Additionally, when the skilled artisan wants to secure a doorway to a room, they can consider any of a variety of known access and egress control systems, which include a vast array of automated solutions that can readily be implemented for Use in connection with the present teachings. For example, means for controlling an examination room can include, among other ways, closed-circuit and/or network-based streaming video feed, mechanical door locks and exit devices, access controls, electronic locking devices and PC-managed network security/control equipment (i.e., computer implemented).

In various embodiments, the primary information carrier comprises an electronic document. In a variety of embodiments, the electronic document comprises an examination (e.g., a bar examination).

According to various embodiments, the secured electronic document creation software is configured to run on a computing apparatus, such as a personal computer, laptop computer, or the like. In a variety of embodiments, the untrusted agent comprises an examinee (e.g., a college or university student, or a law-school graduate sitting for a bar examination). In various embodiments, the authority comprises an examiner (e.g., a college or university professor or teaching assistant (TA), or a state bar examiners).

In accordance with various embodiments, the secondary information carrier comprises a paper form. In a variety of embodiments, the paper form includes at least one perforation.

In a variety of embodiments, the identifying information contained in the secondary information carrier and the identifying information embedded in the primary information carrier each comprises a string of alphanumeric characters. In various embodiments, such string of alphanumeric characters includes both (i) at least one letter and (ii) at least one number.

Further aspects of the present teachings relate to systems and methods for detecting substitution of information by an untrusted agent. In various embodiments, a computer-readable storage medium is provided with an executable program stored thereon, wherein the program can instruct a microprocessor to perform the following steps: (i) providing a word processing function whereby an untrusted agent (e.g., examinee) can create informational content in an electronic document; (ii) blocking access to other materials and applications on a computer on which the program is running; (iii) monitoring operations and actions performed on the computer; (iv) logging computer activity and time data; (v) creating identifying information; (vi) embedding the identifying information into the electronic document; (vii) encrypting the electronic document; (viii) reporting the identifying information at a selected moment to the untrusted agent; (ix) decrypting the electronic document; and, (x) outputting the identifying information for display.

A variety of embodiments include instructions to perform the step of copying the electronic document as a file to a memory device (e.g., flash memory), as for manual delivery to an authority (e.g., an examiner); or electronically transmitting the document via a network, e.g., using protocols such as FTP, HTTP, HTTP POST, or email.

Various embodiments include instructions to perform the step of anonymously identifying the untrusted agent (e.g., examinee).

Additional aspects of the present teachings relate to methods for detecting substitution of information by an untrusted agent. In various embodiments, a method comprises: (i) providing secured electronic document creation software for use by an untrusted agent for creating informational content within a primary information carrier during a controlled time period and in a controlled location; (ii) a step for embedding identifying information into the primary information carrier; (iii) a step for protecting the informational content and identifying information within the primary information carrier by encryption; (iv) a step for preventing editing of the informational content within the primary information carrier after the controlled time period and outside the controlled location; (v) a step for reporting the identifying information to the untrusted agent at the end of the controlled time period and before the untrusted agent exits the controlled location, with a direction to the untrusted agent to record the identifying information to a secondary information carrier; (vi) a step for delivering the primary information carrier, by the untrusted agent via a primary information channel, to an authority, and delivering the secondary information carrier, by the untrusted agent via a secondary information channel to the authority, before the untrusted agent exits the controlled location; and, (vii) a step for comparing the identifying information contained in the secondary information carrier with the corresponding identifying information embedded in the primary information carrier, whereby the results of the comparing step are used to determine whether substitution of the primary information carrier occurred.

According to various embodiments, the primary information carrier comprises an electronic document.

In a variety of embodiments, the electronic document comprises an examination (e.g., a bar examination).

In various embodiments, the untrusted agent comprises an examinee.

According to a variety of embodiments, the authority comprises an examiner.

In various embodiments, the secondary information carrier comprises a paper form.

According to a variety of embodiments, the paper form comprises at least one perforation.

In a variety of embodiments, the identifying information contained in the secondary information carrier and the identifying information embedded in the primary information carrier each comprises a string of alphanumeric characters.

In a variety of its aspects, the present teachings relates to methods for creating a customized client software application by an authority for distribution to, and use by, a selected group of others. In various embodiments, such a method can comprise; (i) configuring the software application online via a secure account on a website; (ii) posting an electronic event listing, searchable by the group, for which the software application has been specifically configured; (iii) electronically requesting publication of the software application;

(iv) responsive to step automatically creating the configured software application and publishing it for downloading and use by the group; (v) receiving a plurality of outputs, each prepared by a respective member of the group using the software application; and, (vi) managing the plurality of outputs via the secure account on the website.

In accordance with various embodiments, the outputs comprise high-value data files. In various embodiments, the high-value data files comprise electronic documents.

In various embodiments, the software application comprises secured electronic document creation software.

According to various embodiments, the managing step comprises viewing and/or downloading a plurality of the outputs.

In a variety of embodiments, the authority comprises an examiner and/or the group comprises untrusted agents.

In accordance with various embodiments, the method further comprises detecting for substitution of the high-value data files.

In various embodiments, the receiving step further comprises receiving a unique electronic identifier via a network which functions as a secondary data channel.

Various aspects of the present teachings relate to systems for creating a customized client software application by an authority for distribution to a selected group of others, where the software application can be used by individual members of the group to produce a specific desired output within specific restrictions set by the authority, and then that output returned to the authority for managing. In various embodiments, the system can comprise: (i) a website, comprised of: (a) a secure account management system; (b) a module for setting key preferences of the client software application; (c) a module for setting availability of the client software application; (d) a module for committing to publication of the client software application and publishing the client software application; (e) a module for individual members of the group to find the correct client software application for their specific event and download the software; (f) a module for receiving outputs submitted by members of the group that are the product of the client software application; and, (g) a module for the authority to manage the submitted outputs; (ii) a client software application for producing an output; and, (iii) a set of defined procedures for each of the above modules in order to gather information required by each.

According to various embodiments, for each method, and at each subsidiary step in the process where information is requested by the computer system pertinent to each method, detailed instructions can be given to increase the chance the interaction will produce the desired result from a complex process, taking into consideration the high likelihood both the authority and the untrusted user may be new users of the system. The instructions explain, without limitation and as variously relevant, why the information has been requested, how it may impact other information that has been requested, guidelines and limitations for effective entry of the information, etc.

In various embodiments, the output comprises a high-value data file. The high-value data file can comprise, for example, an electronic document, such as an exam document. In various embodiments, the software application comprises secured electronic document creation software. According to various embodiments, the authority comprises an examiner and/or members of the group comprise untrusted agents. In accordance with various embodiments, the client software application produces a file configured for detecting whether substitution of the high-value data file has occurred.

Further aspects of the present teachings relate to methods for transforming a generic software application provided to each member of a selected group of end-users into a customized software application for use by each member at a specific respective event in which the member participates. According to various embodiments, such a method can comprise, for example: (i) providing a generic software application to one or more members of the selected group of end-users; (ii) providing an event code to each member of the group provided with the generic software application in step (i), wherein each event code is unique to the specific respective event in which the member participates; (iii) instructing each member of the group provided with an event code in step (ii) to enter their event code into the generic software application provided in step (i); (iv) responsive to entry of the event code into the generic software application by each member, electronically requesting and receiving from a network-connected server information pertinent to the specific respective event in which the member participates; and, (v) populating the generic software application provided in step (i) with the information requested and received in step (iv), whereby a customized software application is created for use by each member of the group during the specific respective event in which the member participates.

In still further of its aspects, the present teachings relates to systems for transforming a generic software application provided to one or more members of a selected group of end-users into a customized software application for use at a specific respective event, selected from a plurality of events, in which the member participates. In accordance with various embodiments, such a system can comprise, for example: (i) a generic software application; (ii) an event code comprising a string of alphanumeric characters that are unique to the specific respective event in which the end-user participates; (iii) a display for presenting a user interface generated by the generic software application to the end-user, wherein the user interface comprises a field for entry of the event code by the end-user; (iv) one or more user-input devices disposed for communication with the generic software application permitting entry of the event code into the field by the end-user; and, (v) an internet-connected server hosting information particular to the specific respective event in which the end-user participates; wherein the server is configured to electronically receive a request for the hosted information made by the generic software application upon entry of the event code into the field by the end-user, and to respond by electronically transmitting the requested information to the requesting generic software application; whereby, receipt of the information in step (v) transforms the generic software application into a customized software application for use by the end-user during the specific respective event in which the member participates; and, wherein the customized software application can be used by the end-user to produce a specific desired output within specific preset restrictions.

In yet further of its aspects, the present teachings relate to methods for transforming a generic software application provided to each member of a selected group of end-users into a customized software application for use by each member at a specific respective event, selected from a plurality of events, in which the member participates. In accordance with various embodiments, such a method can comprise, for example: (i) providing a generic software application comprising a lookup feature to one or more members of the selected group of end-users; wherein the lookup feature comprises an event listing comprising a plurality of events, including the specific respective event in which the member participates; (ii) presenting the lookup feature to each member of the group provided with the generic software application step (i); (iii) instructing each member of the group presented with the look up feature, to use the lookup feature to identify and select the specify respective event in which the member participates; (iv) responsive to selection using the lookup feature of the specific respective event to which the member participates, electronically requesting and receiving from a network-connected server information pertinent to such specific respective event; and, (v) populating the generic software application with the information requested and received in step (iv), thereby creating a customized software application for use by each member of the group during the respective event in which the member participates.

Other aspects and iterations of the present teachings are further described below.

BRIEF DESCRIPTION OF THE DRAWINGS

FIG. 4 depicts, in flow chart format, a method for creating a customized client software application by an authority for distribution to a selected group of others, where the software application can be used by individual members of the group to produce a specific desired output within specific restrictions set by the authority, and then that output returned to the authority for managing.

FIG. 5 depicts, in flow chart format, a method for distributing a generic software application to a selected group of others and subsequently requesting and retrieving particulars pertinent to each member of the group upon entry into the software application of a respective event code by each member that is unique to a specific respective event in which the member participates.

DESCRIPTION OF VARIOUS EMBODIMENTS

Figure 1:
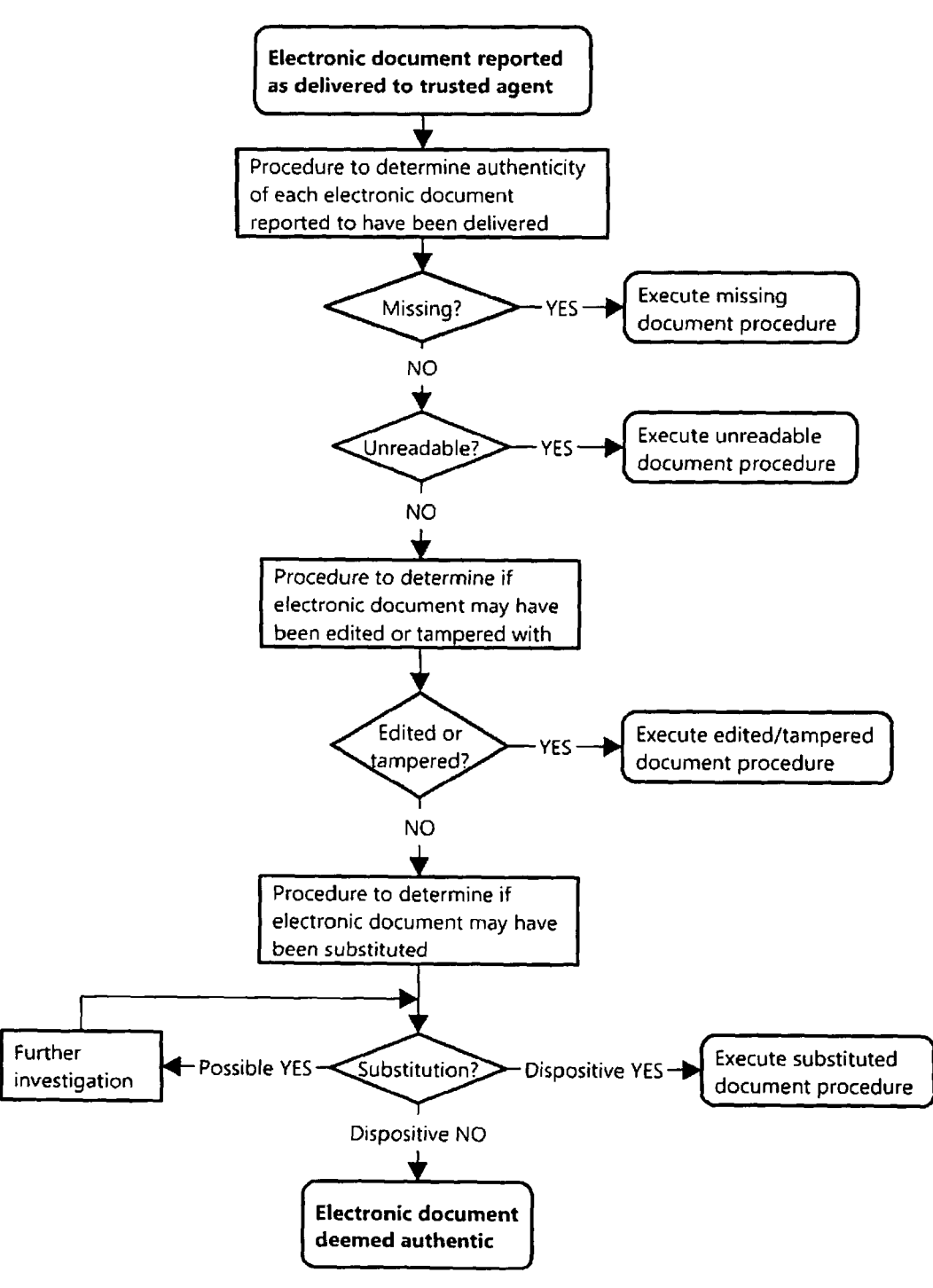
FIG. 1 depicts, in flow chart format, possible negative outcomes of electronic document delivery when the documents are inspected for status for several criteria (file missing, unreadable, edited or tampered with, substituted); according to various embodiments of the present teachings.

Reference will now be made to various embodiments. While the present teachings will be described in conjunction with various embodiments, it will be understood that they are not intended to limit the present teachings to those embodiments. On the contrary, the present teachings are intended to cover various alternatives, modifications, and equivalents, as will be appreciated by those of skill in the art.

According to various embodiments, aspects of the present teachings relate to systems and methods for the creation, transmittal, review of, and related operations on, as well as the prevention, detection, and such, of unauthorized manipulation (e.g., substitution) of high-value data files, including electronic documents. In various embodiments, aspects of present teachings relate to processes for providing satisfactory certainty and proof that a data file, e.g., an electronic document, was created without access to other data files whether on a computer or accessed via a computer network, and in certain situations, further, that a data file purported to have been created on a computer by an untrusted agent was actually so created.

As described above, in certain situations, it can be useful to know a document has been created within a secured environment, for example: an essay written as an answer to an exam. For example, for an exam, an authority such as an examiner may wish to have satisfactory certainty that all answers were written without access to disallowed information during a specific time period in a room monitored to restrict the arrival/departure and behavior of examinees. In times past, when essays were written by hand, physical creation of documents was accomplished by means that did not carry the risk of access to other information (e.g.: blank parchments, blank paper, blank booklets sometimes called "bluebooks", etc.), and physical collection of documents at the end of the exam session provided satisfactory certainty the documents were created in the exam room during the exam time.

In some exams today, examinees may use a computer to create electronic documents in the exam room during exam time, with no special restriction on access to information on the computer or available over networks. Examiners may yet be able ascertain when the document was written, chiefly, by printing the collected files shortly after the end of exam time.

Now, in certain other exams today, examiners may impose the use of document creation software that includes functions designed to control or prevent access to other information on the computer. In these situations, it can be strongly desirable to assure examinees have access to correctly configured and properly functioning software fit for this purpose, which various embodiments of the present teachings address.

Now, also, in certain other situations, it may not feasible for the electronic documents to be collected and printed or otherwise produced quickly enough to ascertain with satisfactory assurance when and where it was created. In these situations, it can be strongly desirable nonetheless to have such assurance, which various embodiments of the present teachings address.

In accordance with various embodiments, a general way of describing the situation with regard to the creation and use of the data file can be to say that software designed for the purpose of controlling access to other information is to be prepared for the specific situation, provided to the untrusted agents who have been directed to use it for that situation, actually used during the prescribed time and in the prescribed place, the resulting file delivered to the computer system as directed, the file processed by the computer system according to the preferences of the authority, and the file made available to the authority in a useful format. According to various embodiments, an example can be to say that an examinee uses software that has been set up by an examiner for the specific exam, creates a document within restrictions enforced by the software, and delivers the resulting document as directed. Documents produced in this manner are typically, but not necessarily, encrypted by the software. The computer system into which the examinee delivers the file, and where the examiner goes to view or download the result, can typically, but not necessarily, be accessed via a network interface such as a website, and can comprise software running on the same or another server. In various embodiments, the computer system receives the data file, decrypts it if encrypted, and generates a final document according to preferences preset by the examiner, in a format that is typically, but not necessarily, a common type such as Adobe Portable Document Format ("PDF"). In various embodiments, the file is made available to be viewed or downloaded from the website. Access to the decrypted document can be secured by a standard means, such as a login using a username and password.

In accordance with various embodiments, a general way of describing the situation with regard to the assurance of when and where the file was created can be to say that a document created by a trusted means within the secured environment is to be transferred to its destination by an untrusted agent through an untrusted communication channel. In various embodiments, the present teachings ensure that in spite of the untrusted nature of both the agent and the communication channel that the document received at the destination is a true, intact and uncorrupted copy of the original. An example, according to various embodiments, can be to say that an exam essay written or validated by using trusted software in a controlled exam room during a controlled exam time is to be transferred by the examinee to the examiner through the use of an uncontrolled electronic delivery method. Various embodiments of the present teachings give the examiner assurance the document received is the one created in the controlled exam room during the controlled exam time.

Four possible negative outcomes of document delivery are identified—the document is: 1) missing; 2) unreadable; 3) edited or tampered with; or 4) substituted. FIG. 1 depicts, in flow chart format, possible negative outcomes of electronic document delivery when the documents are inspected for status for several criteria (file missing, unreadable, edited or tampered with, substituted), according to various embodiments of the present teachings. The present teachings address, among other things, the fourth possible negative outcome (substitution). Missing documents and unreadable documents are easy to detect, whereas trusted means of creating or validating the document can use encryption, data hash or other method to assure editing has not occurred. However, to protect against the agent or channel substituting a bogus document that is intact, uncorrupted, and created by the same trusted means, a method of detecting attempted substitution is desirable.

As used herein, the terms "electronic document" or "document" refer to what holds what the examinee is typing, and are encompassed by the general term "carrier." The term "carrier" can further encompass, without limitation, a carrier wave or signal, a paper form, a punch card, a clay tablet, etc.

As used herein, the term "channel" refers to the mechanism, method or process by which the carrier is transmitted to the authority. In a variety of embodiments, it can be useful to conceptualize a channel as a conduit by which a carrier, such as an electronic document, is transmitted or delivered. More particularly, in various embodiments, everything between when an untrusted agent has a document and when the document reaches its destination (e.g., an authority, such as an examiner) can comprise a channel. For example, the channel can be conceptualized as everything that happens in the interstice between when an examinee initiates the process of getting an electronic document to an authority and when the document is received or accepted by the authority, where the details of that interstitial activity may vary. It is to be noted that there can be a plurality of channels, e.g., "primary," "secondary," "tertiary," etc. In this regard, according to various embodiments, primary and secondary channels can be provided which can be separate and distinct with at least one of the channels (e.g., the secondary channel) being trusted in nature.

As used herein, the term "agent" refers to an entity or party, where a "trusted agent" is either the authority itself, or an agent the authority expressly designates and trusts, and is responsible for the secured environment (or secured location) wherein the carrier is to be produced, and an "untrusted agent" is a person in the secured environment, under the authority's control but expressly not trusted by the authority, who is the creator of a carrier, such as an electronic document, which is the subject of the method.

The present teachings provide for the creation of a second "agent" and a second "channel" and use them to transfer trustworthy information about the document to the destination. In accordance with various embodiments, the second agent and/or channel may be separate from the primary agent and/or channel. The information transferred by the second agent/channel can be anything from a very short alpha-numeric sequence all the way up to a duplicate of the document, depending on the situation, so long as it includes enough information to verify the document's authenticity.

The degree of assurance of the integrity of documents depends on the configuration of the secondary (or tertiary, etc.) agent/channel and the information transferred, and may be impacted by factors such as deliberate effort or collusion to deceive the destination agent, or random chance resulting in identical inaccurate information about the document. The present teachings provide systems and methods for protecting against a deliberate effort(s) to deceive and minimizing exposure to random chance.

An exemplary embodiment, in accordance with the present teachings, can be described with reference to the field of secured essay examinations. In a typical exam, examinees create documents in a secured environment under the supervision of an authority such as an examiner (trusted agent) in both: a) a specific secured location where access and activity are controlled, and b) a specific time interval.

In accordance with various embodiments, examinees create their documents, essentially essays answering the exam question, within a computer software application, hereinafter referred to as "exam software," designed to facilitate exam creation and administration. In this example, the exam software is generally, and among other provisions, comprised of a word processing interface with features for: frequent saving and backup of exam documents; blocking access to disallowed materials on the computer; encrypting the work; administrative functions such as anonymously identifying the examinee; and tools for transmission of documents to the examiner.

The creation of electronic documents by the systems and methods of the present teachings can, in various embodiments, include these characteristics:

A. Due to the use of a specific method of data encryption, the electronic documents can only be created, modified, edited, encrypted, inspected, or similarly acted upon by software created for the purpose.

B. Following creation of a document, due to the designated operation of the software used for the purpose, the contents cannot be acted upon or modified by the user who created the file by use of the software.

C. The contents of the document cannot be modified beyond what the software created for the purpose will allow without causing the document to become unreadable by the software.

D. Depending on the interface design, the software can be used to embed any data into the file at any time, and the data cannot be inspected or modified unless the software allows it.

In this scenario, the exam software is a trusted source and renders the trusted document, which then must be transmitted to the examiner by the examinee (untrusted agent) using an electronic communication method (untrusted channel). The most common methods for transmitting the document can include, but are in no way limited to, copying the file to a flash memory device for manual delivery to the examiner, or electronic transmittal of the document using industry-standard methods such as FTP, HTTP, HTTP POST, or email.

Figure 2:
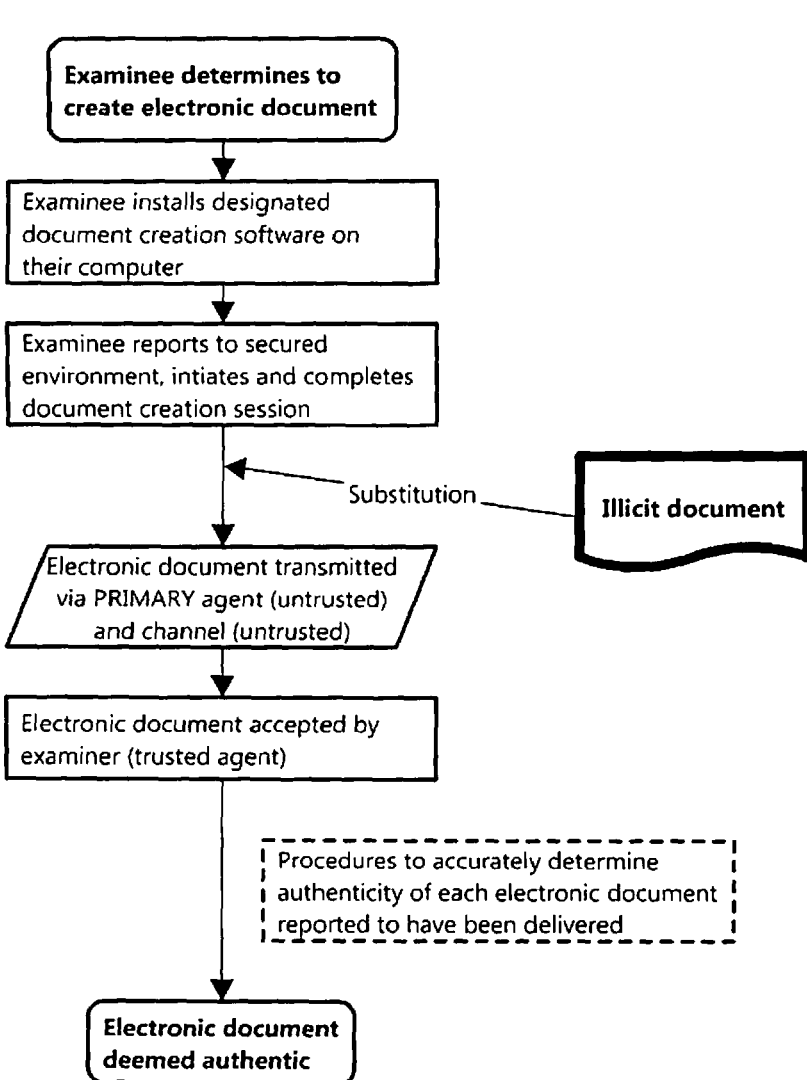
FIG. 2 shows, in flow chart format, that somewhere between acceptance of an electronic document and deeming it authentic, there needs to be a step to determine its authenticity; according to various embodiments of the present teachings.

Transmission of the document'to an authority such as an examiner is a necessary step, but is vulnerable to cheating if the examinee substitutes an illicit document undetected. FIG. 2 shows, in flow chart format, that somewhere between acceptance of an electronic document and deeming it authentic, there needs to be a step to determine its authenticity, according to various embodiments of the present teachings. The invention provides a reliable method to ensure the document received is in tact the document created in the secured exam room during the exam, it does so by requiring and enabling transmission of an additional item of trustworthy information about the document, which may readily be checked against the original document.

In the exemplary embodiment, this is accomplished as follows: 1) the exam software creates a new item of information about the document in the form of a short numeric "confirmation code", which is 2) recorded into the secondary channel by written notation on a specially designed, designated and handled paper form, which is 3) transmitted by the examinee, who serves as both secondary and primary agent, whereupon 4) the form is inspected, validated, and a receipt is created and returned to the examinee.

A. The confirmation code is created by the exam software and embedded into the encrypted document. Once the code has been embedded in the encrypted document it cannot, by virtue of the encryption, be altered. The code is revealed to the examinee at the completion of each exam session at the moment the examinee confirms to the software their intention to end the session and deliver the document to the examiner. The examinee is directed to record it by handwriting, the code into a specified location, on a paper form that has been provided and then deliver the completed form to the examiner before leaving the secured environment. Display, recording and delivery of the code may be accomplished by a variety of means, and is not limited to this exemplary method. The code is available for inspection by the examiner using separate tools designed as part of the exam software system to decrypt and display desired information from the documents created by the software.

The confirmation code does not have to be globally unique, although it could be made so. The code merely has to be random enough that it cannot reasonably be reproduced during the time span between when the document was completed and when it is collected. This degree of randomness is expected to be tailored to the environment and processes where the system is typically used. In the exemplary embodiment, exam sessions typically last for three hours, essentially all documents are collected within 10 minutes of the end of the session, and a very small number of documents are collected over the next few days.

It is possible to describe the difficulties faced by a cheater attempting to subvert the present teachings by the substitution method. In order to effectively substitute a document with the same confirmation code embedded, it would be necessary to rewrite the entire exam, since the software is typically set to disallow the ability to insert large portions of pre-written text into the document. Further, most exams important enough to utilize exam software include complex, lengthy questions, whereas most examiners do not make the questions available outside the exam environment, nor are examinees in most cases allowed to remove even scratch paper where notes or details of the questions could have been recorded, making it extraordinarily difficult for a cheater to even reproduce the question accurately. Further, the exam would need to be rewritten over an identical length of time, three-hours in this exemplary embodiment, since the exam software system includes tools designed to flag documents written in time periods at variance with expected timings. Further, the text would have to be typed in at a natural-seeming pace across the three-hour period as opposed to all at once during the shorter time it might take to type the text continuously, since the system also includes the functionality to review progress over the entire document creation period. At this point, upon saving the illicit document, the confirmation code is shown. A four-digit confirmation code such as used by the exemplary system produces a one-in-ten-thousand (1:10,000) chance of receiving the right confirmation code in the illicit document. Failure to receive the needed code would require a cheater to try again spreading the typing over three hours. It is easy to see the time and effort required to attempt to cheat in this manner is excessive.

In the exemplary embodiment, a four-digit number was selected as a reasonable balance between security and ease-of-use for examinees needing to transcribe the code as displayed onscreen. In other embodiments, it is anticipated the parameters might suggest a longer code is appropriate. A six-digit numeric code reduces the odds of repeating to one-in-a-million; a four alpha-character code, even removing potentially ambiguous characters such as "I", "O" and "L", reduces the odds to one-in-several-hundred-thousand. Key factors favoring a longer code would be if more time is allowed far delivery of the document and or if less time is provided for creation of the document. Unanticipated factors are possible; however, the code can be modified and extended flexibly to accommodate them. Additional methods may also be used to augment the security value of the confirmation codes, including for example, but not limited to: certain codes may be omitted from the list of acceptable codes so that their use is prima facie evidence of fabrication; non-standard characters may be used; the number of characters may be varied without notice; the code may be provided to the examinee in a machine-readable format or other format that may be recorded by other means, such as an image, sound, barcode, QR-code, visible color or light sequence, infrared pulse, radio-frequency emission, or the like to be scanned or captured using the examinee's cellphone, other device provided to the examinee, other device employed by the examiner; the code may be produced by another output device such as a computer printer, image projection device, or the like.

B. The secondary channel of information pertinent to the document is typically, in the exemplary embodiment, a simple paper form. Information collected includes, typically, but is in no way limited to: a) the examinee's identifying information, commonly an anonymous identification number, and b) a confirmation code. The information is typically written in multiple locations on either side of a perforation. In various embodiments, recording of the identifying information and confirmation number can be accomplished, for example, without limitation, by having the user write the information on a physical document, by having the user create a machine readable code (e.g., a bubble grid such as used to record answers on standardized multiple choice exams, a punched card system, a character recognition system, etc.), by means of an infrared reading device, by means of a barcode reading device, by means of a wired or wireless computer network, or the like.

C. Transmission of the confirmation code by the secondary agent, in the exemplary embodiment, is accomplished by physical collection of a paper form. Simple procedural steps are typically enough to provide adequate assurance that examinees do not fail to deliver the paper form and that the form includes the necessary information. In the exemplary embodiment, trusted agents of the examiner are posted in the path of exit from the room, and are charged with inspecting, validating and collecting the paper forms from examinees.

In various embodiments, other methods of collecting the information are contemplated, and could include, but are in no way limited to: a barcode scanning; video recording of the transaction; electronic entry of the information at a collection station set up for the purpose; electronic transmission of the information using common wireless networking systems such as wifi or cellphones; etc.

D. The form is inspected, the notations validated, and the receipt is created when, in the exemplary embodiment, on satisfactory review of the notations, the agent marks the form, usually with a rubber stamp created for the purpose, being careful to make the mark across the line of perforation. The agent then tears the form along the perforation, handing one half to the examinee as a receipt and retaining the other half.

In various embodiments, validation of the identifying information and confirmation number could be accomplished, for example, without limitation, by, first, human inspection of a physical document, by computer scanning of a human- or machine-readable code, or by other means of intake, and subsequently, via non-human validation by comparing the acquired identifying information and confirmation number to examples, against parameters, or by some other formula, to determine whether the information meets criteria for validity established for the purpose.

In various embodiments, issuance of the receipt could be accomplished, for example, without limitation, by, human production of a physical document, by computer production of a physical document, or by computer production of an electronic document, and in the case of a physical document, delivered manually by a human, or automatically by a computer output device such as a computer printer, etc., or, in the case of an electronic document, delivered electronically such as by email, SMS, via login to a website, on a flash memory device, etc.

Although the examinee, an untrusted agent, is responsible for recording the confirmation code on paper form, safeguards protect the process. If the examinee records a code that does not match the code embedded in the exam, the exam can be invalidated, although this may be determined to be a false positive if the document was collected successfully through the standard procedure at the end of the normal exam time. If the examinee attempts to record a code and then hope to create a document later with that code, they cannot anticipate which code the software will embed. If the examinee accurately reports the code then attempts to substitute a document written later, again, they cannot anticipate which code the software will embed in the later document.

To say it another way, the present teachings contemplate and address a plurality of significant risks from means that an examinee, or any other user of the system, or a person operating on behalf of such, could employ to attempt to bypass event security, including, but not limited to one, a combination, and/or all of the following:

A. An examinee could properly submit the identifying information and confirmation number at the end of the event, but then attempt to submit a document other than the one created at the event. In various embodiments, this is the primary risk addressed and to be prevented by the present teachings. The risk is resolved, for example, by the fact the identifying information and confirmation number encrypted in the document are compared after the event to those reported at the event, and mismatching information is dispositive.

B. It is contemplated the examinee may accidentally transpose characters in the identifying information and/ or confirmation number when manually recording it. The examiner can undertake reasonable review to decide whether the explanation is plausible, considering the length, character makeup, or other format of the identifying information and confirmation number will be designed to accommodate such a situation while retaining the effectiveness of the method.

C. An examinee could claim the document was submitted timely but the event authority lost it. The risk is the examinee could attempt to submit a document created after the event. The risk is resolved, for example, by the fact that so long as the identifying information and confirmation number were properly captured during the authorized time period, the information inside the encrypted document must match, since the chance of separately creating a new data file with the correct information has been reasonably eliminated.

D. An examinee could claim the identifying information and confirmation number were submitted but the event authority lost the information. The risk is the same as above, which is that the examinee could attempt to submit a file created after the event. The risk is resolved, for example, by the fact that a receipt is provided, such that if the examinee cannot present the receipt, no relief can be permitted.

Figure 3:
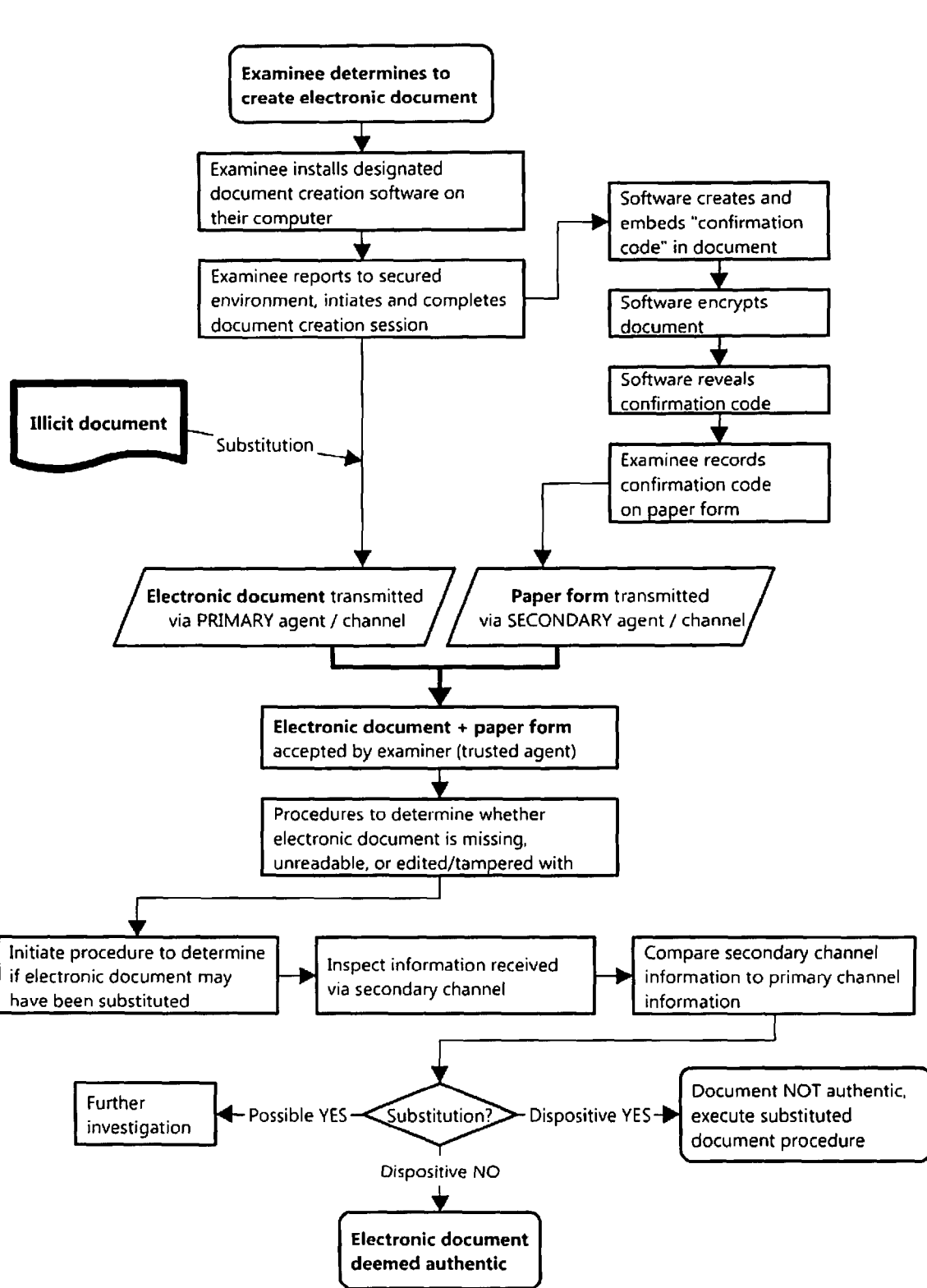
FIG. 3 depicts, in flow chart format, a method for detecting substitution of electronic documents; according to various embodiments of the present teachings.

Once the information form is collected, it is usually processed by the examiner's agents by transcribing the notations into electronic format, which can then be readily compared with the corresponding information in the exam files using tools provided as part of the exam software system. Mismatched information is flagged for further review, and those exams are investigated using methods not part of this application. Matching information assures the examiner the document collected via the primary channel is valid and could only have been created in the secured environment. FIG. 3 depicts, in flow chart format, a method for detecting substitution of electronic documents, according to various embodiments of the present teachings.

FIG. 4 depicts, in flow chart format, an embodiment of a method for creating a customized client software application by an authority for distribution to a selected group of others, where the software application can be used by individual members of the group to produce a specific desired output within specific restrictions set by the authority, and then that output returned to the authority for managing, according to various embodiments of the present teachings. In various embodiments, the software application, as depicted, comprises secured document creation software. In some embodiments, the specific desired output, as depicted, comprises electronic documents, such as exam documents. More particularly, the "others" (see above) can be, for example, law-school graduates and the exam documents can be, for example, bar exam documents.

FIG. 5 depicts, in flow chart format, a method for distributing a generic software application to a selected group of others (e.g., examinees) and subsequently requesting and retrieving particulars (e.g., data/information) pertinent to each member of the group upon entry into the software application of a respective event code by each member that is unique to an event in which the member participates. According to various embodiments, the software application, once configured responsive to entry of the event code, can be used by individual members of the group to produce a specific desired output within specific predetermined restrictions, and then that output returned to the authority for managing. In various embodiments, the software application comprises secured document creation software. In some embodiments, the specific desired output comprises electronic documents, such as exam documents. More particularly, the "others" (see above) can be, for example, law-school graduates and the exam documents can be, for example, state bar exam documents. Alternatively, the others can be, for example, college or university students and the exam documents can be, for example, a test or exam for a selected course or class at a college or university.

According to various embodiments, an event code according to the present teachings can comprise, for example, a relatively short alpha numeric string of characters (e.g.: (i) at least four, or at least five alpha numeric characters and (ii) no greater than six, or no greater than eight, or no greater than ten alpha numeric characters). In various embodiments, such alpha numeric string of characters comprises both (i) at least one letter and (ii) at least one number. Further, the event code space can be substantially larger than the data space (e.g., by at least 10,000 times, or by at least 100,000 times, or by at least 1,000,000 times, or greater). In this way, an examinee can be given a alpha numeric code that is easy to accurately enter as a result of its relatively short length, yet which is long enough to provide an extremely large number of possible codes such that it is almost impossible that an examinee could merely guess a code that would work. For example, an alpha numeric event code comprising 5 characters (3 lowercase letters, 2 numbers) would provide for 60,466,176 different possible combinations. Further, an event code according to various embodiments of the present teachings can exclude one or more characters from the complete alpha-numeric set to facilitate accurate readability by an examinee. For example, according to various embodiments, one or more of the following characters, often misidentified or otherwise confused in various settings, are omitted: I/1; O/0; S/5; and/or B/8. Further in this regard, see, for example, Grissinger, Matthew. "Avoiding confusion with alphanumeric characters." *P & T: a peer-reviewed journal for formulary management* vol. 37, 12 (2012): 663-5; incorporated herein by reference.

According to various embodiments, a generic copy of the software application can be provided to each of the others, e.g., college or university students about to take an exam (i.e., examinees), for one of their respective courses or classes. As used herein, "generic software" means a software application that includes basic feature and functionality sets common to all exams for all courses or classes, irrespective of the particulars of any specific course or class. As used herein, "particulars" can include, for example, exam security configuration, exam questions, submission information, formatting preferences, and/or other parameters, information, and/or data. Further regarding particulars, the others (e.g., examinees) can be provided with a unique event code for entry into the generic software, which can act to trigger the software application to request and receive, from a network-connected (e.g., internet-connected) server, a set of particulars specific and correlating to the specific event code entered. The others can then take the exam and subsequently submit it. In various embodiments, the unique code, so entered, can match each exam taken with a respective instructor (e.g., professor or teaching assistant (TA)) giving or sponsoring the exam. In other words, the unique code can associate each exam with (i) a particular examination event or test-taking session; and, (ii) a particular instructor giving or sponsoring the examination and/or such instructor's account.

As used herein, the term "instructor's account" refers to the constellation of preferences and courses a particular instructor defines for use in the system. For example, according to various embodiments, an instructor can comprise a professor or teaching assistant (TA) at a college or university and such instructor's account can comprise, e.g., the instructor's billing information, contact information, and configuration data/information for exams (e.g., mid-term exam, final exam, and the like) given in the instructor's courses taught during the then-current semester or trimester. In various embodiments, it can further comprise, e.g., data/information for exams, such as midterm and final exams, given for the one or more courses taught by the instructor during a previous semester or trimester.

According to various embodiments, an event code according to the present teachings can comprise, for example, one or more of the following features/characteristics:

Event code can comprise a relatively short alpha numeric string of characters (e.g.: (i) at least four, or at least five alpha numeric characters and (ii) no greater than six, or no greater than eight, or no greater than ten alpha numeric characters).

Event code can exclude some characters from the full alpha numeric set to facilitate accurate readability by an examinee.

Event code space is substantially larger than data space (e.g., by at least 100, or at least 1,000, or at least 10,000 times).

Event code can reference course configuration stored in a network-connected (e.g., internet-connected) database.

Event code can be entered into software as proxy for manual selection from an exhaustive list.

Event code can control access to the data prior to an examination event because the code reasonably can't be guessed accurately and so must be provided.

Event code can control access to the data post-event because the server can be configured to allow retrieval of course-configuration data/information for a code only within a previously specified time window.

Event code can reference configuration data/information which can include, for example, exam security configuration, exam questions, submission information, formatting preferences, etc.

Those skilled in the art will appreciate how use of a unique event code, as described herein, can avoid the need to construct multiple, different pre-builds of the software application to include both (i) the common feature/functionality sets and (ii) respective particulars for each of the plurality of different classes or courses with which it is used. Rather, the generic software can be distributed and employed universally across a plurality of different classes or courses, with the particulars for each specific class or course being pulled off a server at the outset of an event, e.g., immediately prior to the start of an examination session, in real time. That is, use of the event code allows each student to initiate a customization process in which their generic software is loaded/populated with particulars for their specific course or class "on the fly," thereby obviating the need to prebuild multiple versions of fully featured and functional software in order to accommodate each and every different course or class with which it is used.

Additionally, those skilled in the art will appreciate how use of an event code, as described herein, can divorce data/information delivery from software delivery, so a generic software application can be delivered well in advance of (e.g., days, weeks, or months), or shortly prior to an examination event (e.g., immediately prior to the start of the examination-taking session) to all end users and/or potential end-users (e.g., examinees) and particulars (e.g., data/information) can subsequently be delivered on demand and in real time via entry of a unique event code into the generic software application by each examinee.

According to various embodiments, the event code is not provided to an examinee until the outset of an examination session, at which time it is first provided. If the event code were instead provided to the examinee in advance of the examination session, then it could be used by the examinee to illicitly obtain particulars for the examination in advance. That is, the examinee could enter the event code into the generic software application, which software application is provided to the examinee prior to the start of the examination session. Thus, provision of the event code in advance of the examination session can enable the examinee to cheat and thereby obtain an unfair advantage. Of course, cheating is exactly what the instant application seeks to prevent.

With the event code of the present teachings, however, such cheating is substantially impossible. Again, the event code isn't provided to an examinee until the outset of an examination session. Further, the event code can control access to the data for an examination because the code reasonably can't be guessed accurately and so must be provided. The event code can't reasonably be guessed because the use of at least four alpha numeric characters provides far too many possibilities from which to choose.

Further aspects of the present teachings contemplate a generic software application that includes a lookup feature in addition to, or as alternative to the above-described event code. According to various embodiments, the lookup feature comprises an event list that can be populated on demand and in real time. For example, an event list can be provided in the software application that is provided to or downloaded by an examinee. The event list can comprise, for example, one or more school names, one or more courses or classes, and one or more specific examination events. The event list can be provided in the generic software application as it is provided to all examinees for all examination sessions for different colleges or universities that use the software application or retrieved from a server shortly before the start of the examination session. An examinee can then navigate the event listing to find and select the particular examination event at hand. Upon selection, a process much like that described above with respect to entry of an event code can take place, wherein a customization process takes place such that the generic software retrieves and is loaded/populated with particulars for the (specific) course or class at hand.

In various embodiments, an event list in accordance with the present teachings can comprise, for example, a hierarchical or nested drop-down list of colleges or universities, departments, instructors, courses, and/or type of examination event (e.g., mid-term, final exam) that can be navigated by an examinee using their exam-taking computer and mouse or touchpad. Those skilled in the art will appreciate that many suitable permutations for an event list, beyond that just specifically described, can be implemented and employed within the scope of the present teachings.

As discussed herein, the examination location is controlled. It is noted that the knowledge that the skilled artisan imparts to the present teachings are more than adequate to control a location, as such term is used herein and understood in the art. See, for example the publication entitled, "MRGS Assessment Information for Students and Parents/ Caregivers 2014" (incorporated herein by reference) which exemplifies, at least in part, the knowledge of the skilled artisan. For example, at pages 20-22 (under the heading, "APPENDIX—Procedures for Controlled Conditions") many aspects of a Controlled Room are described. As can be seen, this publication describes many techniques, well-known to those skilled in the art, commonly employed for controlling a location.

In an exemplary embodiment of the present teachings, trusted agents of the Examiner are posted (in-person) in the path of exit from the room. From there, the trusted agent will see, upon monitoring, whether the untrusted agent stays in the location or leaves the location. In contrast, if there were no trusted agent monitoring the location (locally or remotely), and there were no other means of control, the location would be uncontrolled.

Further regarding control of an examination location, those skilled in the art will appreciate that the untrusted agent is either in a designated location or not, and that fact can obviously be readily determined in many ways. For example, a trusted agent, such as a proctor, can simply monitor to see if an untrusted agent is in the controlled location, or not. Such monitoring can be in-person or remotely, such as by way of a video feed. Regarding the latter, exemplary camera-controlled exam rooms are described, for example, in K. Laine, et al., Electronic Exam in Electronics Studies, 44th SEFI Conference, 12-15 Sep. 2016, Tampere, Finland; incorporated herein by reference.

Additionally, when the skilled artisan wants to secure a doorway to a room, they can consider any of a variety of commercially available access and egress control systems, which include a vast array of automated solutions that can readily be implemented for use in connection with the present teachings. For example, Security Door Controls, Inc. (Camarillo, CA) develops, manufactures and markets mechanical door locks and exit devices, access controls, electronic locking devices and security systems solutions that can readily be implemented for use in connection with the present teachings. (See, e.g., U.S. Pat. No. 5,876,073A; incorporated herein by reference.) Among other things, Security Door Controls, Inc. offers PC managed network security/control solutions (i.e., computer implemented).

Further aspects of controlled examination environments (including protocols, procedures, and means for securing an examination room) suitable for use herein are described, for example, in (i) "General Requirements Bulletin for Admission to the Examination for Registration to Practice in Patent Cases before the United States Patent and Trademark Office" by The United States Patent and Trademark Office, Office of Enrollment and Discipline (OED), Issued February 2020, Sections IX ("The Examination") and X ("Test Administration") at pp. 19-23; (ii) *Exam Rules*. The State Bar of California, vvww.calbar.ca.gov/Admissions/Examinations/ Exarn-Rules; (iii) "Assessment Report: Administration Practices for Standardized Assessments" by Sasha Zucker, Pearson Education, Inc., 2004; and, (iv) "Appropriate Administration Practices with Standardized Tests" published in Testing Information Bulletin No. 3 by Harcourt Brace Educational Measurement, June 1996; each of which is incorporated herein by reference.

All references set forth herein are expressly incorporated by reference in their entireties for all purposes.

While the principles of the present teachings have been illustrated in relation to various exemplary embodiments shown and described herein, the principles of the present teachings are not limited thereto and include any modifications, alternatives, variations and/or equivalents thereof.

What is claimed is:

1. A method for transforming a generic software application provided to each member of a selected group of end-users into a customized software application for use by each member at a specific respective event in which the member participates, wherein said event comprises an examination given during an examination-taking session; comprising:

(i) prior to the start of the examination-taking session, providing a generic software application to one or more members of the selected group of end-users, wherein the generic software application comprises functionality for (a) electronic document creation during examination-taking sessions, and (b) one or more of: saving and backup of documents, blocking access to disallowed materials, encrypting documents, and transmission of documents to an authority;

(ii) at the outset of the examination-taking session, providing an event code to each member of the group provided with the generic software application in step (i), wherein each event code is comprises a string of alpha numeric characters unique to the specific respective event in which the member participates and identifies the specific respective event from among a plurality of events for which information is hosted by a network-connected server; and wherein the event code excludes one or more characters from the complete alphanumeric set to facilitate accurate entry of the event code by each member into the generic software application;

(iii) instructing each member of the group provided with an event code in step (ii) to enter their event code into the generic software application provided in step (i);

(iv) responsive to entry of the event code into the generic software application by each member, electronically requesting and receiving from the network-connected server information pertinent to the specific respective event in which the member participates, wherein the server is configured to respond to requests for the information pertinent to the specific respective event only within a predetermined time window associated with the examination-taking session; and (v) populating the generic software application provided in step (i) with the information requested and received in step (iv), whereby a customized software application is created for use by each member of the group during the specific respective event in which the member participates;

wherein the customized software application is the same application as the generic software application, as populated with the event-specific information, and is the application for use by each member to create a respective electronic document during the event.

2. The method of claim 1, wherein the event code comprises no more than six alpha numeric characters.

3. The method of claim 1, wherein said generic software application comprises secured electronic document creation software for taking exams.

4. The method of claim 1, wherein said group comprises untrusted-agents.

5. The method of claim 4, wherein said untrusted agents comprise examinees.

6. The method of claim 1, wherein the excluded alphanumeric characters are selected from the group consisting of I/1, O/0, S/5, and B/8.

7. A system for transforming a generic software application provided to one or more members of a selected group of end-users into a customized software application for use at a specific respective event, selected from a plurality of events, in which the member participates; the system comprising:

(i) a generic software application, wherein the generic software application comprises functionality for (a) electronic document creation during examination-taking sessions, and (b) one or more of: saving and backup of documents, blocking access to disallowed materials, encrypting documents, and transmission of documents to an authority;

(ii) an event code comprising a string of alphanumeric characters that are unique to the specific respective event in which the end-user participates, and that identifies the specific respective event from among the plurality of events; wherein the event code excludes one or more characters from the complete alphanumeric set to facilitate accurate entry of the event code by the end-user into the generic software application;

(iii) a display for presenting a user interface generated by the generic software application to the end-user, wherein the user interface comprises a field for entry of the event code by the end-user;

(iv) one or more user-input devices disposed for communication with the generic software application permitting entry of the event code into the field by the end-user; and (v) an internet-connected server hosting information for the plurality of events, including information particular to the specific respective event in which the end-user participates; wherein the server is configured to electronically receive a request for the hosted information particular to the specific respective event in which the end-user participates made by the generic software application upon entry of the event code into the field by the end-user, and to respond by electronically transmitting the requested information to the requesting generic software application; and wherein the server is configured to respond to requests for the hosted information only within a predetermined time window associated with each respective event;

whereby, receipt of the information from the server in (v) transforms the generic software application into a customized software application for use by the end-user during the specific respective event in which the end-user participates; wherein the customized software application can be used by the end-user to produce an electronic document within specific preset restrictions; and wherein the customized software application is the same application as the generic software application, as populated with the event-specific information, and is the application for use by the end-user to create the electronic document during the event.

8. The system of claim 7, wherein the event code comprises no more than six alpha numeric characters.

9. The system of claim 7, wherein said software application comprises secured electronic document creation software.

10. The system of claim 7, wherein members of the group comprise untrusted agents.

11. The system of claim 10, wherein said untrusted agents comprise examinees.

12. The system of claim 7, wherein the excluded alphanumeric characters are selected from the group consisting of I/1, O/0, S/5, and B/8.

13. A system for transforming a generic software application provided to one or more members of a selected group of end-users into a customized software application for use at a specific respective event, selected from a plurality of events, in which the member participates; wherein the event comprises an examination given during an examination-taking session, and wherein each member of the group comprises an examinee taking the examination; the system comprising:

(i) a generic software application, wherein the generic software application comprises functionality for (a) electronic document creation during examination-taking sessions, and (b) one or more of: saving and backup of documents, blocking access to disallowed materials, encrypting documents, anonymously identifying the examinee, and transmission of documents to an authority;

(ii) an event code comprising a string of alphanumeric characters that are unique to the specific respective event in which the examinee participates, wherein the event code associates each exam with (a) a particular examination event or test-taking session, and (b) a particular individual associated with the particular examination event or test-taking session;

(iii) a display for presenting a user interface generated by the generic software application to the examinee, wherein the user interface comprises a field for entry of the event code by the examinee;

(iv) one or more user-input devices disposed for communication with the generic software application permitting entry of the event code into the field by the examinee; and (v) an internet-connected server hosting information for the plurality of events, including information particular to the specific respective event in which the examinee participates; wherein the server is configured to electronically receive a request for the hosted information particular to the specific respective event in which the examinee participates made by the generic software application upon entry of the event code into the field by the examinee, and to respond by electronically transmitting the requested information to the requesting generic software application; and wherein the server is configured to respond to requests for the hosted information only within a predetermined time window associated with each respective event;

whereby, receipt of the information from the server in (v) transforms the generic software application into a customized software application for use by the examinee during the specific respective event in which the examinee participates;

wherein the customized software application can be used by the examinee to produce an electronic document within specific preset restrictions;

and wherein the customized software application is the same application as the generic software application, as populated with the event-specific information, and is the application for use by the examinee to create the electronic document during the event.

14. The system of claim 13, wherein the particular individual is an instructor giving or sponsoring the particular examination event or test-taking session.

* * * * *